United States Patent [19]
Peters

[11] 3,775,904
[45] Dec. 4, 1973

[54] SELF-WATERING FLOWER POT
[75] Inventor: James R. Peters, Chicopee, Mass.
[73] Assignee: Universal Products Development Corporation, Simsbury, Conn.
[22] Filed: July 6, 1971
[21] Appl. No.: 160,009

[52] U.S. Cl. .................................. 47/38.1, 215/12
[51] Int. Cl. ............................................. A01g 27/00
[58] Field of Search .................. 47/38, 38.1, 34.13; 215/12

[56] References Cited
UNITED STATES PATENTS

| 3,043,053 | 7/1962 | Peters | 47/38.1 |
| 2,770,957 | 11/1956 | Bronson | 47/38 X |
| 2,691,245 | 10/1954 | Yohe | 47/38.1 |
| 2,680,871 | 6/1954 | Gullholm | 47/38 X |
| 1,879,784 | 9/1932 | Benz | 47/38.1 |

FOREIGN PATENTS OR APPLICATIONS

| 1,096,014 | 12/1967 | Great Britain | 47/38.1 |
| 453,258 | 6/1913 | France | 47/38.10 |
| 257,051 | 3/1949 | Switzerland | 47/38.1 |
| 820,802 | 11/1937 | France | 47/38.10 |
| 14,554 | 6/1907 | Great Britain | 47/38.10 |
| 1,200,457 | 7/1970 | Great Britain | 47/38.1 |

Primary Examiner—Robert E. Pulfrey
Assistant Examiner—Eugene H. Eickholt
Attorney—Peter L. Costas

[57] ABSTRACT

A self-watering flower pot has a unitary, double-walled construction comprising an outer shell, a potting receptacle therewithin, and a water-receiving chamber in the space therebetween. A cavity and a channel both of which open downwardly, are formed in the underside of the bottom wall of the inner reeptacle, and the channel slopes upwardly from the cavity toward the inside wall to define an air flow path. The container has a sealable opening for the introduction of water into the chamber, and the bottom wall of the potting receptacle has an aperture communicating with the cavity formed therein. Water passing by capillary action into the inner receptacle from the chamber creates a vacuum in the space between the double walls; the vacuum is relieved when the potting medium is sufficiently dry to permit air to permeate and to pass through the aperture and along the air path into the water chamber, thereby allowing an additional amount of water to flow.

7 Claims, 3 Drawing Figures

PATENTED DEC 4 1973 3,775,904

Inventors
James R. Peters

By *Peter L. Costas*
Attorney

SELF-WATERING FLOWER POT

BACKGROUND OF THE INVENTION

In the past, a variety of flower pots, planters, and the like have been proposed which have self-contained reservoirs for irrigation of the vegetation therewithin. In some instances, such devices have been designed for automatic control of the water to furnish it on a substantially continuous basis and to minimize the frequency with which refilling of the reservoir is necessary. Although the prior art devices of this type have met with varying degrees of commercial success, they have generally tended to be somewhat deficient in one or more respects.

In some cases, the prior self-watering flower pots have not been sufficiently reliable or efficient in terms of furnishing water to the plant; either they have tended to cause flooding by metering the water too rapidly, or they have failed to provide a supply of water adequate to sustain the vegetation. In other cases, undue complexity and/or the difficulty of achieving adequately sealed seams between parts of the devices have made manufacture difficult and expensive, and have resulted in high rejection rates of unacceptable units and in a need for time-consuming and costly testing procedures.

Accordingly, it is an object of the present invention to provide a novel self-watering flower pot that is capable of furnishing water on a substantially continuous basis and at a desirable rate to sustain the vegetation therewithin.

It is also an object of the invention to provide such a flower pot which is of relatively simple construction, and which can therefore be manufactured with a high degree of facility and economy.

Another object of the invention is to provide a flower pot having the foregoing features and advantages, which in addition may be produced with a limited number of sealing and bonding operations, thereby further facilitating production and minimizing the need for leakage testing.

SUMMARY OF THE DISCLOSURE

It has now been found that the foregoing and related objects can be readily attained in a self-watering flower pot comprising a unitary, double-walled container with two spaced apart shell elements. Each of the shell elements has a bottom wall and a peripheral sidewall extending upwardly therefrom, and the sidewalls are interconnected about their upper ends to provide a water-receiving chamber in the space between the shell elements. The container has an opening for water-filling access to the chamber, and closure means is provided to normally seal the opening against entry of air therethrough. A potting receptacle is provided by the inner of the two shell elements, and its bottom wall is formed to provide passageway defining means. The passageway defining means comprises a downwardly opening cavity spaced inwardly from the sidewall, an aperture through the formed bottom wall communicating with the cavity, and a downwardly opening channel sloping upwardly from the cavity toward the sidewall of the receptacle. A flow path for air is thereby defined from the interior of the receptacle, along the outer surface of the formed bottom wall, and into the chamber. The passageway defining means and the closeable opening of the container provide the only communication between the atmosphere and the chamber, thereby permitting substantial sealing thereof.

Preferably, the passageway defining means includes at least a second channel substantially identical to the first-mentioned channel and extending in a direction generally opposite thereto. The second channel cooperatively defines, with the cavity, a second air flow path, and ensures air flow from the cavity even though the container may be tipped from a normally horizontally supported position. In accordance with another embodiment of the invention, the passageway defining means includes at least a second downwardly opening cavity substantially identical to the first-mentioned cavity and spaced therefrom. A second aperture is provided through the bottom wall to communicate with the second cavity, and an associated channel, substantially identical to the first-mentioned channel, defines an additional air flow path that extends between the second cavity and the inside wall of the receptacle.

Most desirably, the container includes a capillary member seated in the cavity for contact throughout the aperture communicating therewith, and the capillary member preferably is an open-cell sponge. It is especially desirable that the bottom wall of the outer of the two shell elements have an upstanding boss thereon in registry with the cavity of the formed bottom wall. The boss contacts the underside of the capillary member and urges it partially through the aperture so as to ensure intimate contact with the potting medium contained in the receptacle during use. The container may be fabricated of a thermoplastic polymeric material, and it is most desirable that the two shells be joined to one another only at the upper ends of the sidewalls thereof.

DETAILED DESCRIPTION OF THE ILLUSTRATED EMBODIMENTS

Figure 1:
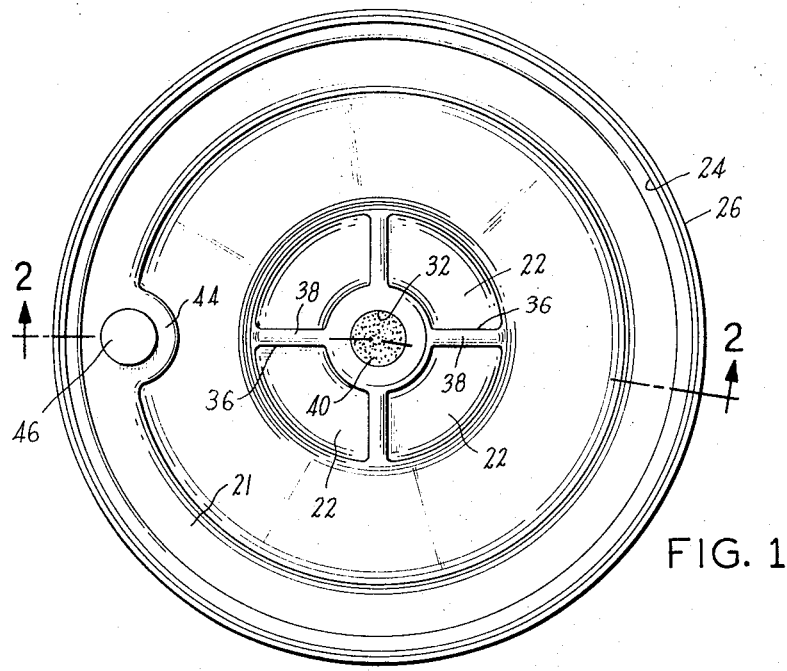
FIG. 1 is a plan view of a self-watering flower pot embodying the present invention.
Figure 2:
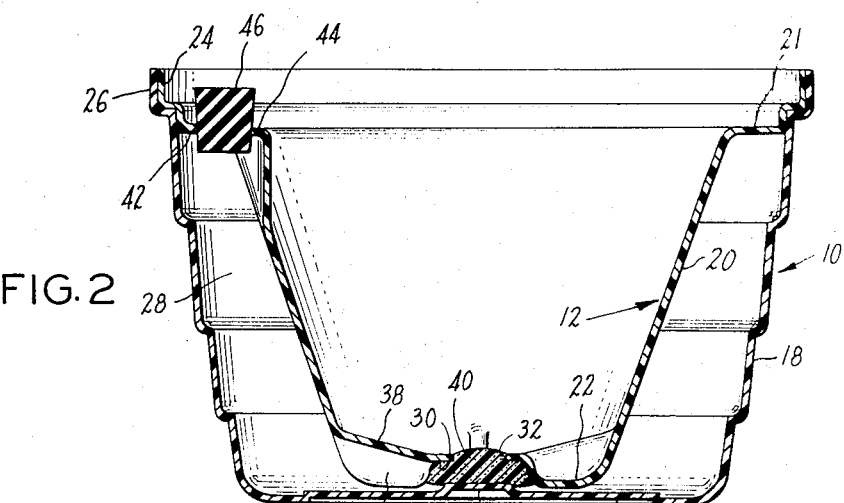
FIG. 2 is a section view thereof along line 2—2 in FIG. 1.

Turning now in detail to FIGS. 1 and 2 of the appended drawing, therein illustrated is a double-walled container providing a self-watering flower pot embodying the present invention, and including an outer shell and an inner potting receptacle, generally designated by the numerals 10 and 12, respectively. The shell 10 consists of a generally circular supporting base or bottom wall 14 having a centrally located, upstanding circular boss 16, and a continuous circumferential sidewall 18 of a scalloped configuration extending upwardly thereabout. The receptacle 12 is contained entirely within the shell 10, and consists of a general frustoconical sidewall portion 20, a circumferential upper shoulder portion 21, and a bottom wall 22 lying across the inner end of the sidewall 20 and blending therewith. The stepped upper end portion 24 of the inner receptacle 12, adjacent the shoulder 21, is nested within the correspondingly configurated upper end portion 26 of the outer shell 10, and the upper end portions 24, 26 are bonded together to form an air-tight seal, such as by heat sealing, solvent or adhesive bonding, ultrasonic welding, or by another appropriate technique. A water-receiving chamber or reservoir 28 is thereby defined between the corresponding portions of the shell 10 and receptacle 12.

The bottom wall 22 of the inner receptacle 12 has a centrally located downwardly opening circular cavity 30 formed in its underside and in axial alignment with the upstanding boss 16 on the base 14. A central aperture 32 is provided through the bottom wall 22 within the cavity 30, and four equidistantly spaced, downwardly opening U-shaped grooves or channels, defined by wall elements 36 and crests 38, extend radially therefrom. Adjacent wall elements 36 extend upwardly from the bottom wall 22 and converge to crests 38, which in turn slope upwardly from the cavity 30 toward the sidewall portion 20.

An open-celled sponge 40 of polyurethane or the like is seated within the cavity 30; the end of the boss 16 contacts the underside of the sponge 40 and forces it partially through the aperture 32 to ensure intimate contact therewith of the potting medium contained in the receptacle 12 during use. The circumferential shoulder 21 of the inner receptacle 12 has an enlarged semicircular portion 44 with an opening 42 formed therethrough, thereby permitting access to the reservoir 28 for filling with water. A suitable stopper or plug 46 is seated in the opening 42 to effect a sealed closure thereof and, with the stopper 46 in place, the reservoir 28 is effectively open to the atmosphere only through the aperture 32 of the bottom wall 22.

It is believed that operation of the novel flower pot of the invention will be readily apparent from the foregoing description. In use, the inner receptacle 12 is filled with a suitable potting soil or other medium (not shown) of appropriate consistency to permit air permeation when it is in a relatively dry state. Preferably, a bed of vermiculite, fine gravel, or of a suitable substitute will be placed in the lower portion of the receptacle 20 in the vicinity of the aperture 32 to ensure that water flow thereabout is adequate. It should be appreciated the sponge 40 can be omitted, with the potting medium directly contacting the water in the cavity 30 and serving to distribute it by capillary action. However, this tends to be less desirable, largely because the potting medium tends to pass into the water chamber. In any event, it will be understood that, as used herein, the term "capillary member" includes soil, vermiculite and other potting media, as well as appropriate porous members other than sponge-like elements.

The plant (not shown) is placed in the soil, the reservoir 28 is filled with water (which may contain dissolved additives for various purposes, if desired), and the plug 46 is replaced in the aperture 42 to seal the reservoir 28 against the atmosphere at that location. Water flowing about the receptacle 12 passes, by capillary action, through the pores of the sponge 40 and into the potting medium within the receptacle 20 through the aperture 32. Since the reservoir 28 is sealed above water level, after a quantity of water has passed into the receptacle 20 a vacuum is created which diminishes, and ultimately terminates, further water flow. As the water in the receptacle 20 is depleted, either by evaporation or through utilization by the growing plant, the dryness of the potting medium permits air to permeate therethrough, and to pass through the aperture 32 and into the cavity 30. As a result, minute bubbles of air collect at the junctures of the channels with the cavity 30, where they coalesce to form larger bubbles. The upward slope of the crests 38 of the channels facilitates and promotes the outward movement of the enlarged air bubbles, and thereby ensures that no air block is created. Since the channels are disposed at diametrical positions about the cavity 30 and extend in opposite directions therefrom, air will flow through at least one of them regardless of the angular displacement of the flower pot relative to a normally horizontally supported position.

Although circular flower pots may be the most prevalent, polyogonal, square, rectangular, or other cross sectional configurations are not unusual. To provide a specific illustration of the possible variations, FIG. 3 of the drawing shows a container that embodies the present invention, and that is generally rectangular in cross section. As will be appreciated, the irrigation demands in such a flower pot are somewhat different from those that exist in a circular pot. Whereas a single, centrally located, water inlet to the potting receptacle is entirely satisfactory in a circular pot, it would not generally be so in a rectangular container, because the supply of water to vegetation located at a distance from the inlet aperture would tend to be inadequate. Accordingly, in the embodiment of FIG. 3 the bottom wall 22' has formed in its underside two downwardly opening cavities and associated apertures 32' that are spaced from one another so as to distribute the water more uniformly into the receptacle. Otherwise, the parts shown in FIG. 3 correspond to those described with reference to FIGS. 1 and 2, and are designated with the same numerals (primed) as were employed therein. Therefore, by analogy, the details of construction will be readily apparent to those skilled in the art, in view of the foregoing description.

Figure 3:
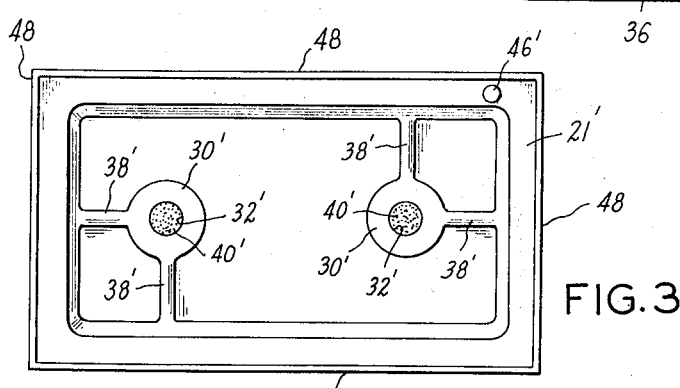
FIG. 3 is a plan view illustrating a second embodiment of the invention wherein the container is generally rectangular and two irrigation apertures are provided.

The most apparent additional difference between the embodiments of FIG. 3 and that of FIGS. 1 and 2 is the arrangement of channels extending from the cavities 30'. As is indicated by the positions of their crests 38', only two channels extend from each of the cavities 30', and each of them is directed toward a different side 48 of the rectangle. As in the case of the circular pot, this ensures adequate air flow and prevents the occurrence of air blockages even in the event that the flower pot may be tipped from a normally horizontally supported position.

Although not illustrated, the container may have internal construction partitioning the space between the shell elements to provide a plurality of independent water chambers therewithin, each having its own water fill opening, such as that designated 42 in FIG. 2 of the drawing. This may be especially appropriate when two or more irrigation apertures are provided, in which instance the apertures will communicate with different chambers to thereby permit various flow rates, fertilization procedures, etc., to be used in selected portions. Of course, the potting receptacle may also be segmented if so desired.

As will be appreciated, one of the significant advantages of the type of construction shown in the drawing is that only one seam need be formed between the parts of the container, i.e., about the mating upper ends 24, 26 of the sidewalls 20, 18 of the receptacle 12 and shell 10, respectively. This obviously simplifies manufacture and minimizes the possibility of air leakage into the internal chamber 28. It will also be noted that no seams or bonding operations are necessary between the bottom walls 14, 22, either for structural or operational purposes. For example, it is not necessary to utilize areas of the bottom wall 14 to cooperatively define the air flow passages with the formed bottom wall 22; this is also a significant factor facilitating manufacture.

Although other types of materials can be used in the construction of the container, it will be appreciated that the synthetic polymers, and especially the thermoplastics, will be most appropriate in the majority of cases. This is not only because of the aesthetic appeal and structural properties that articles made from such materials may exhibit, but also because of the facility and economy with which they can be fabricated into the various configurations desired. Thermoplastics, such as the polyolefins (e.g., polyethylene, polypropylene) and the vinyl and vinylidene polymers (e.g., polystyrene, high impact polystyrene, polyvinyl chloride), to name only a few, are relatively strong, inexpensive, and readily fabricated by conventional molding techniques; accordingly, they will often be used preferentially. Indeed, if the flower pot is appropriately designed for that purpose, it may be possible to integrally form it of such a material in a minimum number of molding steps, thereby providing a substantially seamless, double-walled container embodying the invention hereof.

Thus, it can be seen that the present invention provides a novel self-watering flower pot that is capable of furnishing water on a substantially continuous basis and at a desirable rate to sustain the vegetation therewithin. The flower pot may be of relatively simple construction and may be produced with a limited number of sealing and bonding operations, thereby facilitating production, enhancing the economy of manufacture, and minimizing the need for leakage testing.

Having thus described the invention, I claim:

1. A self-watering flower pot comprising a unitary, double-walled container with two spaced apart shell elements, each having a bottom wall and a peripheral sidewall extending upwardly therefrom with said side walls interconnected adjacent their upper ends to provide at least one water-receiving chamber in the space between said shell elements, said oontainer having an opening for water-filling access to said chamber; and closure means normally sealing said opening against entry of air therethrough, the inner of said shell elements providing a potting receptacle and having its bottom wall configured to provide passageway defining means comprising a downwardly opening cavity spaced inwardly from said sidewall thereof, an aperture therethrough into said cavity, and a plurality of downwardly opening channels spaced about and sloping upwardly away from said cavity toward said sidewall of said receptacle to define flow paths for air from the interior of said receptacle along the outer surface of said bottom wall and into said chamber, said passageway defining means and said closeable opening of said container providing the only communication between the atmosphere and said chamber, so as to permit substantial sealing thereof.

2. The container of claim 1 wherein said passageway defining means includes at least a second downwardly opening cavity substantially identical to said first-mentioned cavity and spaced therefrom; a second aperture through said bottom wall communicating with said second cavity, and channels substantially identical to said first-mentioned channels and defining additional air flow paths that extend between said second cavity and said inside wall of said receptacle.

3. The container of claim 1 wherein a capillary member is seated in said cavity for contact through said aperture communicating therewith.

4. The container of claim 3 wherein said capillary member is an open-celled sponge.

5. The container of claim 3 wherein said bottom wall of the outer of said two shell elements has an upstanding boss thereon in registry with said bottom wall, said boss contacting the underside of said capillary member and urging it partially through said aperture.

6. The container of claim 1 wherein said shells are joined to one another only at said upper ends of said sidewalls.

7. The container of claim 1 wherein said container is fabricated of a thermoplastic polymeric material.

* * * * *